United States Patent
Chen et al.

(10) Patent No.: US 11,669,568 B2
(45) Date of Patent: Jun. 6, 2023

(54) SYSTEMS AND METHODS FOR INJECTING CONTENT INTO MEDIA CONTENT ITEMS

(71) Applicant: Spotify AB, Stockholm (SE)

(72) Inventors: Edward Yizhi Chen, Astoria, NY (US); Ludvig Asger Borgne, Stockholm (SE); Andrew Apollonsky, Brooklyn, NY (US); Minchull Paul Kim, New York, NY (US)

(73) Assignee: Spotify AB, Stockholm (SE)

( * ) Notice: Subject to any disclaimer, the term of this patent is extended or adjusted under 35 U.S.C. 154(b) by 150 days.

(21) Appl. No.: 17/139,223

(22) Filed: Dec. 31, 2020

(65) Prior Publication Data

US 2021/0209154 A1     Jul. 8, 2021

Related U.S. Application Data

(60) Provisional application No. 62/957,081, filed on Jan. 3, 2020.

(51) Int. Cl.
   *G06F 16/68* (2019.01)
   *G11B 27/036* (2006.01)

(52) U.S. Cl.
   CPC .......... *G06F 16/686* (2019.01); *G11B 27/036* (2013.01)

(58) Field of Classification Search
   None
   See application file for complete search history.

(56) References Cited

U.S. PATENT DOCUMENTS

| | | | |
|---|---|---|---|
| 2013/0311575 A1* | 11/2013 | Woods | H04N 21/8456 709/206 |
| 2015/0172737 A1* | 6/2015 | Lechner | H04N 21/84 725/32 |
| 2015/0206168 A1 | 7/2015 | Boggs et al. | |
| 2016/0150292 A1* | 5/2016 | Chandler | H04N 21/8352 725/32 |
| 2016/0292736 A1 | 10/2016 | Yruski et al. | |
| 2018/0084291 A1 | 3/2018 | Wei et al. | |

(Continued)

OTHER PUBLICATIONS

Brad Smith, Meet Simplecast's Moveable Audio Engine, Simplecast Medium, Mar. 13, 2020, from https://medium.com/simplecast/moveable-audio-engine-mae-5f65e55d3c80, 5 pgs.

*Primary Examiner* — Hemant S Patel
(74) *Attorney, Agent, or Firm* — Morgan, Lewis & Bockius LLP

(57) ABSTRACT

An electronic device associated with a media-providing service receives a first media item, including information indicating: a first insertion time within the first media item and a second media item to be played at the first insertion time. The electronic device stores the first media item, including information indicating the first insertion time and information indicating the second media item. In response to receiving a request from a second electronic device to initiate playback of a first media item the electronic device provides the first media item to the second electronic device, including queuing the second electronic device to playback, in sequence and without pausing and without user intervention: the first media item until the first insertion time, the second media item at the first insertion time, and the first media item beginning at the first insertion time after playback of the second media item is ceased.

20 Claims, 12 Drawing Sheets

(56) References Cited

U.S. PATENT DOCUMENTS

2019/0045265 A1    2/2019  Teixeira et al.
2019/0394505 A1  12/2019  Barkley et al.
2020/0133628 A1*  4/2020  Zalon .................. G11B 27/036

* cited by examiner

700

702 At a first electronic device associated with a media-providing service, the first electronic device having one or more processors and memory storing instructions for execution by the one or more processors:

710 Receive a first media content item from a producer of the first media content item, including information indicating: a first insertion time within the first media content item, and a second media content item to be played at the first insertion time. The second media content item is distinct from the first media content item and the second media content item is identified by the producer of the first media content item.

712 Receive an identifier corresponding to the second media content item from the producer of the first media content item.

714 The first media content item includes spoken word content and the second media content item is music.

716 Select a version from a plurality of versions of the second media content item for playback. The selected version of the second media content item is selected based at least in part on a location of the second electronic device.

718 The second media content item is associated with the first media content item.

720 The first media content item includes embedded content and the second media content item replaces the embedded content.

722 The first media content item further includes information indicating: a second insertion time within the first media content item and a third media content item. The second insertion time is different from the first insertion time. The third media content item is distinct from each of the first media content item and the second media content item.

724 The first media content item is not an RSS feed.

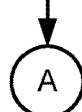

FIG. 7A

SYSTEMS AND METHODS FOR INJECTING CONTENT INTO MEDIA CONTENT ITEMS

PRIORITY APPLICATION

This application claims priority to U.S. Prov. App. No. 62/957,081, filed Jan. 3, 2020, which is hereby incorporated by reference in its entirety.

TECHNICAL FIELD

The disclosed embodiments relate generally to providing media content items for playback, and, in particular, to providing a secondary media content item during playback of a primary media content item.

BACKGROUND

Access to electronic media, such as music and video content, has expanded dramatically over time. As a departure from physical media, media content providers stream media to electronic devices across wireless networks, improving the convenience with which users can digest and experience such content.

As more people access media content items using media content providers, there is an opportunity to use media content items as a platform for exposure to other media content items, products, or services.

For some types of media content, such as podcasts, the overwhelming majority of advertisements are delivered as a pre-compiled file of content and advertisements is distributed to the media content provider. As an effect, podcasters have limited ability to participate in additional monetization that listening platforms may provide because ads are "baked in" to the content. Further, media content providers do not know where best to place advertising without harming the listener's experience.

Another challenge with existing podcasts is that they do not provide a dynamic experience. For example, a podcaster may record an episode in which she interviews an artist about a recently released album. Presently, the only way to associate content from the recently released album with the podcast episode is to, for example, include additional resources in the episode's show notes. Thus, conventional podcasts do not allow podcasters to inject related content into a podcast in a manner that is convenient for listeners.

SUMMARY

There is a need for systems and methods for inserting a secondary media content item into a primary media content item such that the second media content item is provided during (e.g., as part of) playback of the primary media content item. For example, it may be desirable to be able to insert an advertisement for playback during a podcast episode. In some embodiments, it may be desirable to be able to update advertisements so that they remain relevant and up-to-date. In some embodiments, it may be desirable to be able to dynamically insert an advertisement based on information about the user, such as information from the user's profile or information regarding what the user is currently doing. In another example, a producer of a podcast episode may wish to insert a song during playback of the podcast episode. This technical problem may be further complicated by additional challenges, such as rights to play the song and/or what version of the song should be played (e.g., based on what versions of the song are available for playback in different jurisdictions or locations).

In some embodiments, it may be desirable to indicate, to a media providing service, that the song should be played at a specific point (e.g., time) during playback of the podcast episode. This allows the song to be played in instances where the song is accessible to the playback service (e.g., because the media providing service may have the right to play the song). This also allows, in the case where there are multiple versions of the song that are available for playback in different jurisdictions, the media providing service to provide the correct version of the song for playback.

Some embodiments described herein relate to inserting or overlaying (collectively referred to as injecting) advertisements into media content (e.g., podcast episodes) to provide dynamic advertisements to consumers of the media content (e.g., advertisements that can be selected based on preferences of the listener, the listener's context, etc.). By dynamically inserting or overlaying advertisements, rather than playing pre-programmed or "baked in" advertisements, advertisers can obtain real-time metrics of their advertisements and their interactions with the consumer (e.g., views, clicks).

For example, a device plays an episode from a podcast. The episode may include embedded advertisements that are to be played at specific times throughout the episode. A metadata providing service sends, to the device, metadata specific to the episode, including stop and resume times for the episode between which advertisements that are distinct from the embedded advertisements in the episode can be provided. These new advertisements are either inserted or overlaid into the episode and played. After the advertisements are played, the episode resumes playback at the resume time within the first media content item (e.g., relative to a beginning of the first media content item).

In this manner, the user receives seamless advertisement content while advertisers are able to dynamically provide advertisements to targeted audiences.

This technical problem is complicated by the different ways in which media content items may be inserted during playback of a primary media content item. For instance, it may be desirable to dynamically insert secondary media content items during playback of a primary media content item. Additionally, it may also be desirable to dynamically select the secondary media content items during playback of the primary media content item. Further, the primary media content item may include embedded content items, such as advertisements or musical interludes. In some cases, it may be desirable to replace the embedded content items with selected secondary media content items. Thus, the different ways and variations in which secondary media content items can be provided as part of playback of a primary media content item poses a technical challenge.

Some embodiments described herein offer a technical solution to these problems by providing methods of selecting and inserting secondary media content items during playback of primary media content items. To do so, the systems and methods described herein queue the primary media content item and the secondary media content items for playback such that playback of the primary media content item is paused at an insertion time, at which point playback of the secondary media content item commences (e.g., as a separate track). Once playback of the secondary media content item is complete, playback of the primary media content item is resumed at the insertion time. Thus, the systems and methods described herein provide playback of the primary media content item and the secondary media content items without embedding the secondary media content items. Thus, the original files of the primary media content item and the secondary media content item are not altered, allowing for a pick-and-choose scheme of providing media content items for playback.

To that end, in accordance with some embodiments, a method is performed at an electronic device that is associated with a media-providing service. The electronic device has one or more processors and memory storing instructions for execution by the one or more processors. The method includes receiving a first media content item from a producer of the first media content item, including receiving information indicating a first insertion time within the first media content item and a second media content item to be played at the first insertion time. The second media content item is distinct from the first media content item and the second media content item is identified by the producer of the first media content item. The method also includes instructions for storing the first media content item, including storing information indicating the first insertion time within the first media content item and storing information indicating the second media content item to be played at the first insertion time. The method further includes instructions for receiving a first request from a second electronic device to initiate playback of a first media content item, and in response to receiving the first request, the first electronic device provides the first media content item to the second electronic device, including queuing the second electronic device to playback, in sequence and without pausing and without user intervention: the first media content item until the first insertion time, the second media content item at the first insertion time, and the first media content item beginning at the first insertion time after playback of the second media content item is ceased.

In accordance with some embodiments, a first electronic device that is associated with a media-providing service includes one or more processors and memory storing one or more programs configured to be executed by the one or more processors. The one or more programs include instructions for receiving a first media content item from a producer of the first media content item, including receiving information indicating a first insertion time within the first media content item and a second media content item to be played at the first insertion time. The second media content item is distinct from the first media content item and the second media content item is identified by the producer of the first media content item. The one or more programs also include instructions for storing the first media content item, including storing information indicating the first insertion time within the first media content item and storing information indicating the second media content item to be played at the first insertion time. The one or more programs further include instructions for receiving a first request from a second electronic device to initiate playback of a first media content item, and in response to receiving the first request, the first electronic device provides the first media content item to the second electronic device, including queuing the second electronic device to playback, in sequence and without pausing and without user intervention: the first media content item until the first insertion time, the second media content item at the first insertion time, and the first media content item beginning at the first insertion time after playback of the second media content item is ceased.

In accordance with some embodiments, a computer-readable storage medium has stored therein instructions that, when executed by a server system (e.g., computer system, first electronic device) that is associated with a media-providing service, cause the server system to receive a first media content item from a producer of the first media content item, including receiving information indicating a first insertion time within the first media content item and a second media content item to be played at the first insertion time. The second media content item is distinct from the first media content item and the second media content item is identified by the producer of the first media content item. The instructions also cause the server system to store the first media content item, including storing information indicating the first insertion time within the first media content item and storing information indicating the second media content item to be played at the first insertion time. The instructions further cause the server system to receive a first request from a client electronic device to initiate playback of a first media content item, and in response to receiving the first request, the server system provides the first media content item to the client electronic device, including queuing the client electronic device to playback, in sequence and without pausing and without user intervention: the first media content item until the first insertion time, the second media content item at the first insertion time, and the first media content item beginning at the first insertion time after playback of the second media content item is ceased.

Thus, systems are provided with improved methods for dynamically inserting media content items playback of a main media content item.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 7A-7C are flow diagrams illustrating a method of providing a primary media content item that includes inserted a secondary media content item, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first set of parameters could be termed a second set of parameters, and, similarly, a second set of parameters could be termed a first set of parameters, without departing from the scope of the various described embodiments. The first set of parameters and the second set of parameters are both sets of parameters, but they are not the same set of parameters.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1A:
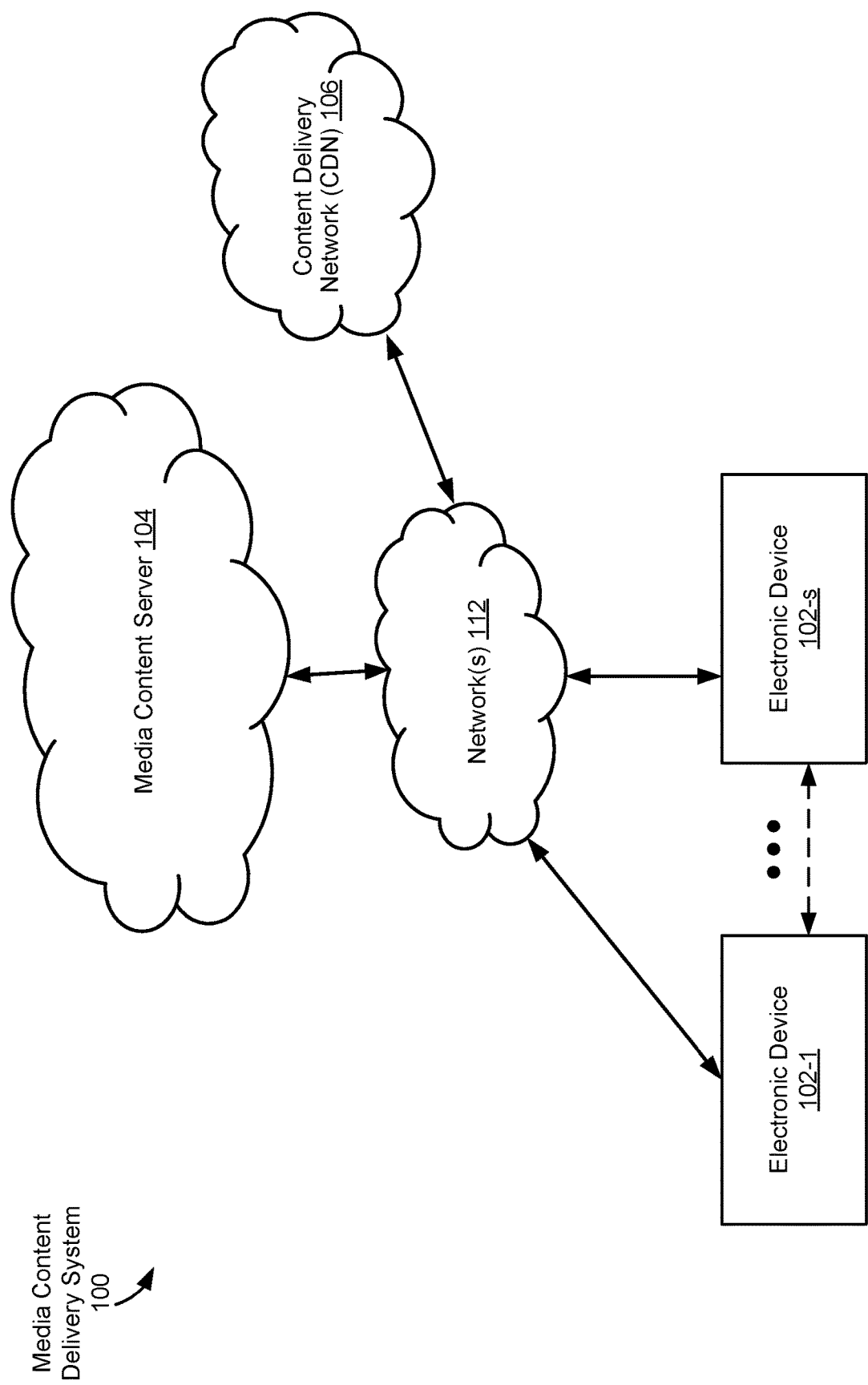
FIG. 1A is a block diagram illustrating a media content delivery system, in accordance with some embodiments.

FIG. 1A is a block diagram illustrating a media content delivery system 100, in accordance with some embodiments. The media content delivery system 100 includes one or more electronic devices 102 (e.g., electronic device 102-1 to electronic device 102-s, where s is an integer greater than one), one or more media content servers 104, and/or one or more content delivery networks (CDNs) 106. The one or more media content servers 104 are associated with (e.g., at least partially compose) a media-providing service. The one or more CDNs 106 store and/or provide one or more content items (e.g., to electronic devices 102). In some embodiments, the one or more CDNs 106 are associated with the media-providing service. In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-s are the same type of device (e.g., electronic device 102-1 and electronic device 102-s are both speakers). Alternatively, electronic device 102-1 and electronic device 102-s include two or more different types of devices.

In some embodiments, electronic devices 102-1 and 102-s send and receive media-control information through network(s) 112. For example, electronic devices 102-1 and 102-s send media control requests (e.g., requests to play music, movies, videos, or other media items, or playlists thereof) to media content server 104 through network(s) 112. Additionally, electronic devices 102-1 and 102-s, in some embodiments, also send indications of media content items to media content server 104 through network(s) 112. In some embodiments, the media content items are uploaded to electronic devices 102-1 and 102-s before the electronic devices forward the media content items to media content server 104.

In some embodiments, electronic device 102-1 communicates directly with electronic device 102-s (e.g., as illustrated by the dotted-line arrow), or any other electronic device 102. As illustrated in FIG. 1A, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-s. In some embodiments, electronic device 102-1 communicates with electronic device 102-s through network(s) 112. In some embodiments, electronic device 102-1 uses the direct connection with electronic device 102-s to stream content (e.g., data for media items) for playback on the electronic device 102-s.

In some embodiments, electronic device 102-1 and/or electronic device 102-s include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). In some embodiments, the electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, and/or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 provides media content items to electronic devices 102-s (e.g., users) of the media-providing service. In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 1B:
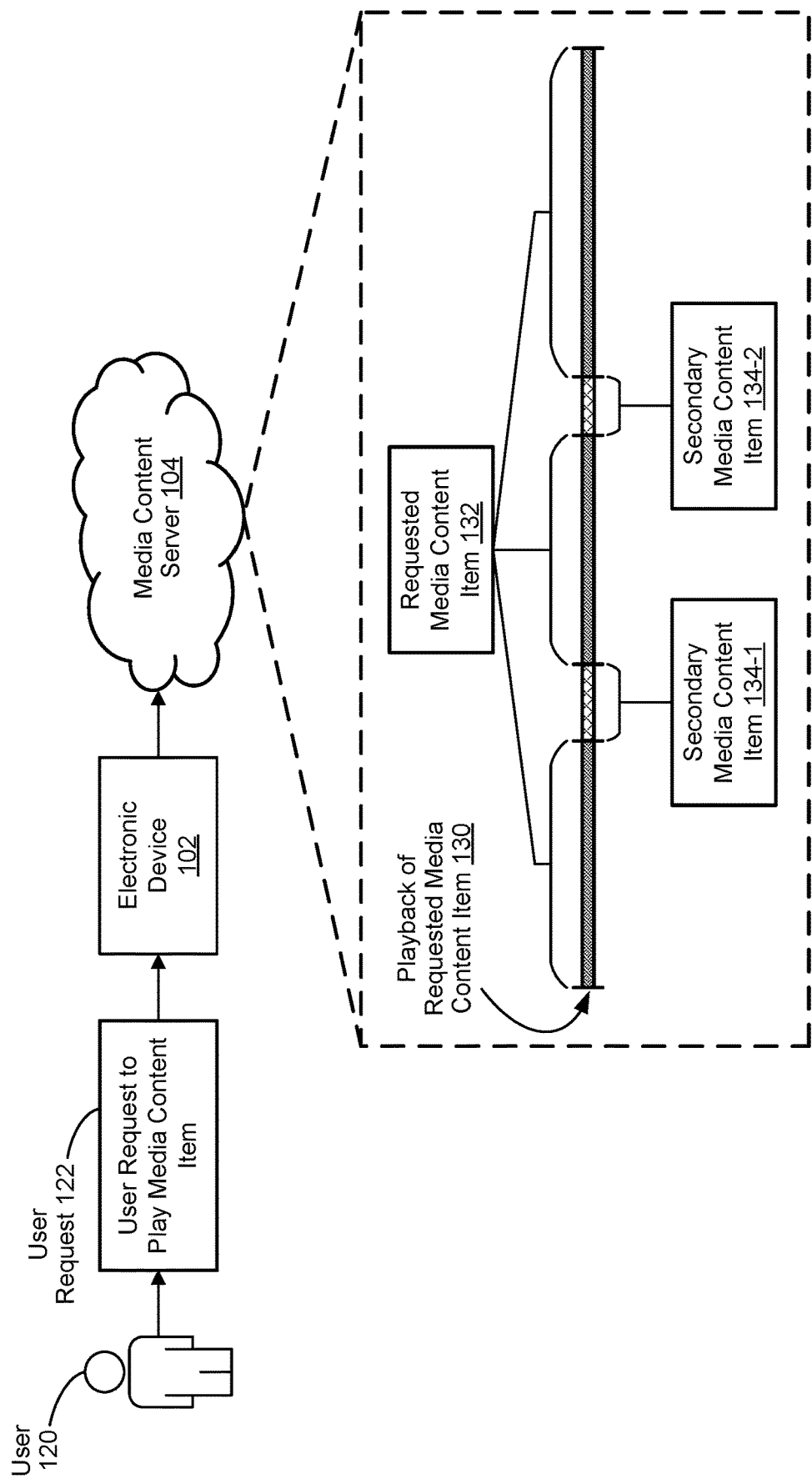
FIG. 1B illustrates providing a media content item requested by a user, in accordance with some embodiments.

FIG. 1B illustrates providing a media content item requested by a user, in accordance with some embodiments. An electronic device 102 (e.g., a user device or a client device, such as a personal computing device, a laptop, a smart home system, a smart accessory, a smart phone) receives a user request 122 from a user 120 to play (e.g., initiate playback) of a media content item 132. The requested media content item 132 (also referred to herein as the primary media content item 132) is hosted by a media content server 104 and may be provided to the electronic device 102 for playback by the media content server 104 or the CDN 106. In some embodiments, a producer (e.g., source) of the requested media content item 132 may want one or more secondary media content items 134 (e.g., secondary media content items 134-1 and 134-2) that are different from the requested media content item 132 to be included as part of playback of the requested media content item 132. For example, the secondary content item 134 may be a song or a promotional offer (e.g., advertisement) that is played during playback of the requested media content item 132.

In some embodiments, in order to include secondary media content item(s) 134, the producer of the primary media content item 132 must include the content in the secondary media content item(s) 134 in the audio stream or audio file of the primary media content item 132. Thus, the secondary media content item(s) 134 are embedded as part of the primary media content item 132. However, this may pose a challenge in certain cases, such as when the producer of the primary media content item 132 does not have clearance to provide the secondary media content items 134 for playback. Additionally, in cases where it may be desirable to include new secondary media content item(s) 134 (e.g., replace or update the secondary media content item(s) 134), the original file or audio stream of the primary media content item 132 would need to be altered. The embodiments disclosed herein provide a method of providing secondary media content items 134 as part of playback of the primary media content item 132 by queueing the primary and secondary media content items to play in a specific sequence, as identified by the producer of the primary media content item 132. The files for the primary media content item 132 and each of the secondary media content items 134 remain separate. Thus, the media content items can be queued for playback in many different variations without the need to edit or change the files of the media content items themselves.

In the example shown in FIG. 1B, the electronic device 102 receives a user request to initiate playback of a media content item 132. In providing the requested media content item 132 for playback, a secondary media content item 134-1 (which may be, for example, an advertisement) is also provided, as well as another secondary media content item 134-2 (which may be, for example, a song by an artist as part of a musical interlude in the requested media content item 132). The secondary media content items 134-1 and 134-2 are queued for playback during the primary media content item 132 such that once playback of the secondary media content item 134 is complete, playback of the primary media content item 132 is resumed (e.g., once the advertisement 134-1 is finished playing, playback of the primary media content item 132 is resumed). Thus, when providing the primary media content item 132 in the future (e.g., to the same user 120 at a future time or to a different user), playback of the primary media content item 132 may include a different advertisement or a different song (e.g., a different version of a song) without having to change or edit the files corresponding to each of the primary media content item 132 and the secondary media content items 134.

Figure 2:
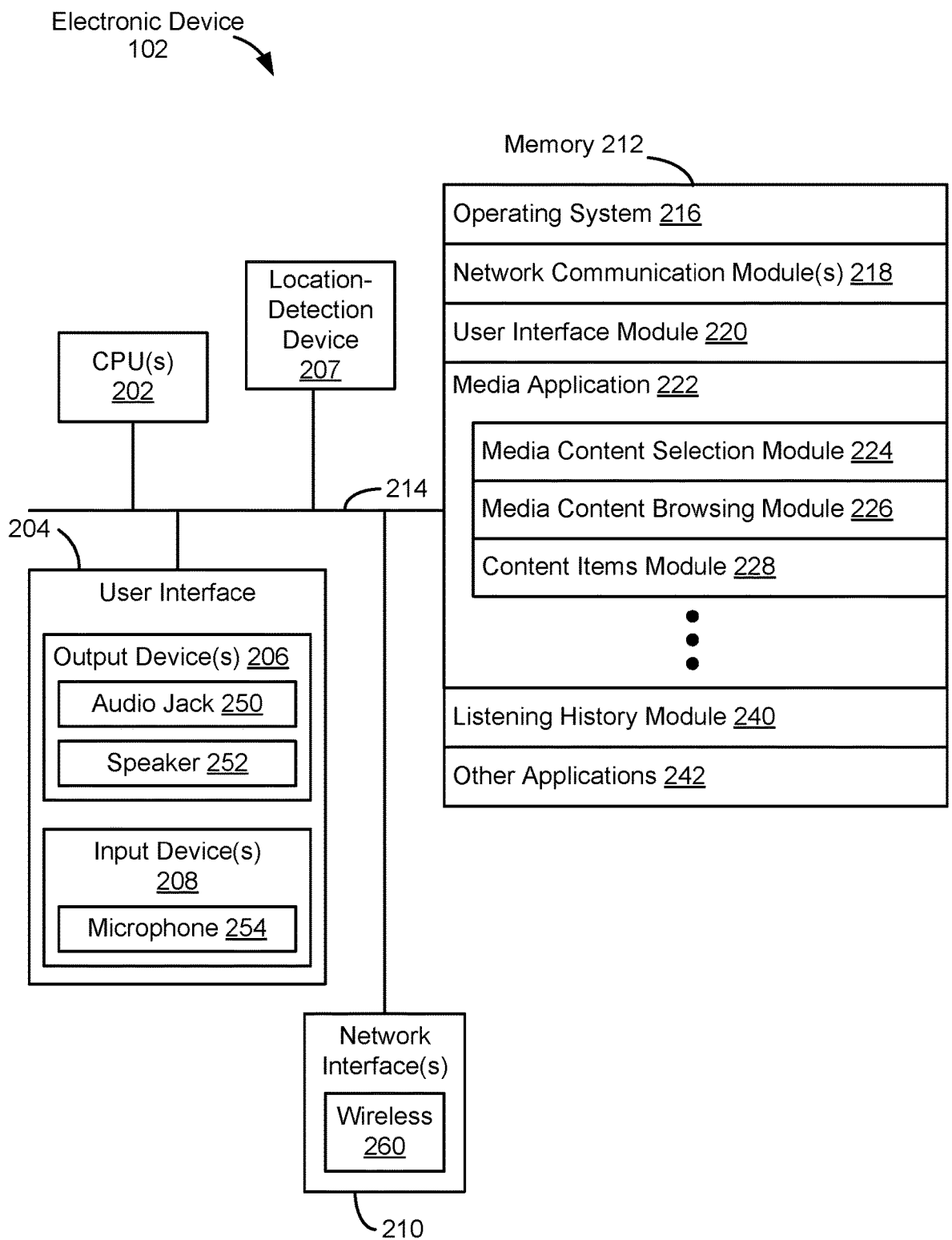
FIG. 2 is a block diagram illustrating a client device, in accordance with some embodiments.

FIG. 2 is a block diagram illustrating an electronic device 102 (e.g., electronic device 102-1 and/or electronic device 102-s, FIG. 1A), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include an audio jack 250 (or other physical output connection port) for connecting to speakers, earphones, headphones, or other external listening devices and/or speaker 252 (e.g., speakerphone device). Furthermore, some electronic devices 102 use a microphone and voice recognition device to supplement or replace the keyboard. Optionally, the electronic device 102 includes an audio input device (e.g., a microphone 254) to capture audio (e.g., speech from a user).

Optionally, the electronic device 102 includes a location-detection device 207, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, and/or or other wireless (e.g., Bluetooth-compatible) devices (e.g., for streaming audio data to the electronic device 102 of an automobile). Furthermore, in some embodiments, the wireless interface 260 (or a different communications interface of the one or more network interfaces 210) enables data communications with other WLAN-compatible devices (e.g., electronic device(s) 102) and/or the media content server 104 (via the one or more network(s) 112, FIG. 1A).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the electronic device 102 to other computing devices (e.g., other electronic device(s) 102, and/or media content server 104) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
    - a media content selection module 224 for selecting one or more media content items and/or sending, to the media content server, an indication of the selected media content item(s);
    - a media content browsing module 226 for providing controls and/or user interfaces enabling a user to navigate, select for playback, and otherwise control or interact with media content, whether the media content is stored or played locally or remotely; and
    - a content items module 228 for storing media items for playback at the electronic device;
- a listening history module 240 (sometimes referred to as a playback history module) for storing (e.g., as a list for each user) media content items that have been presented (e.g., streamed, provided, downloaded, played) to a respective user and/or analyzing playback patterns for one or more users. For example, listening history module 240 may store listener retention information indicating which portions of a media content item a listener played or skipped; and
- other applications 242, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
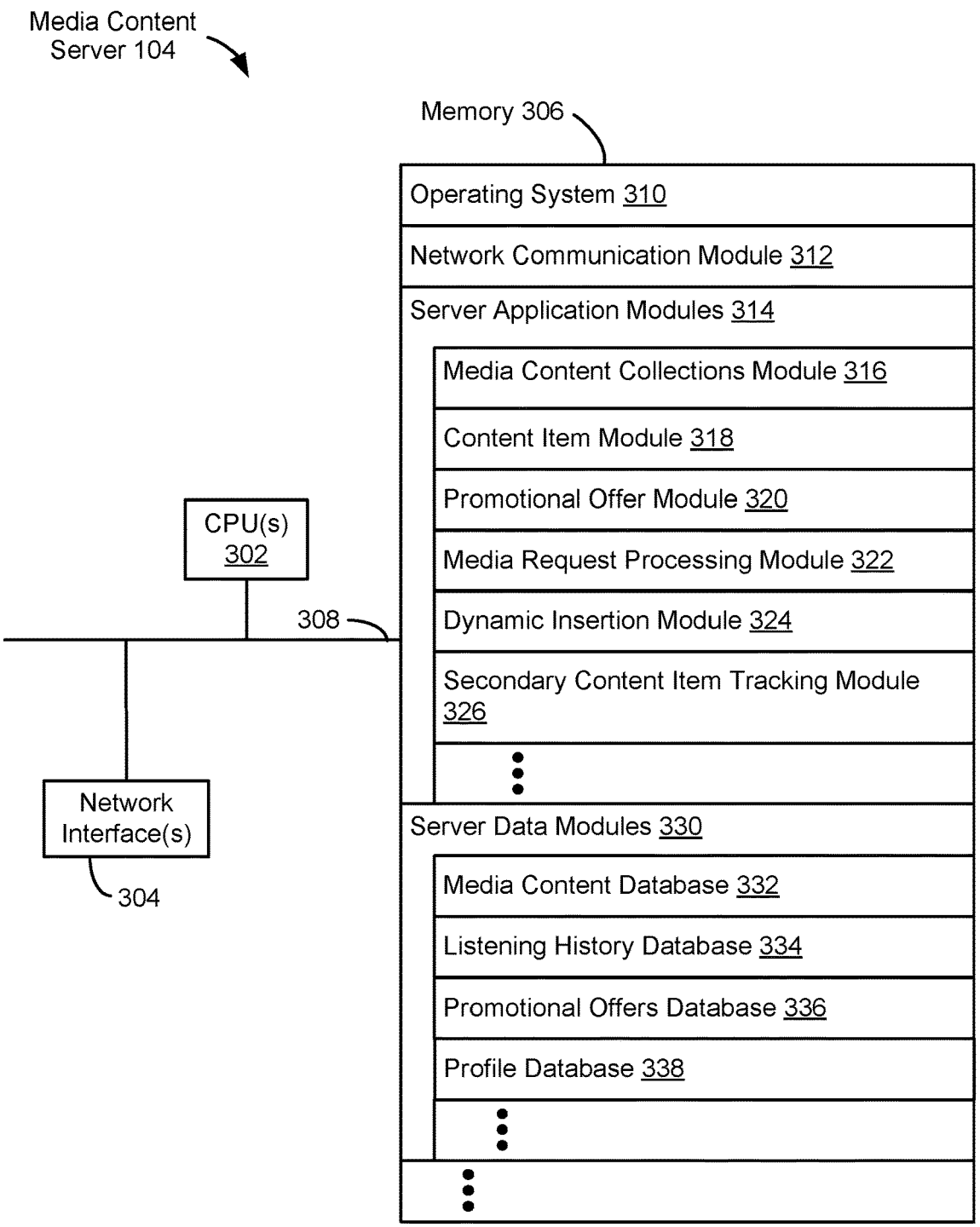
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content collections module 316 for storing and/or creating (e.g., curating) media content collections, each media content collection associated with one or more descriptor terms (e.g., playlist titles and/or descriptions) and/or including one or more media content items;
  - a content item collection module 318 for collecting and storing media items for playback;
  - a promotional offer module 320 for storing and/or selecting promotional offers to be presented to a user. In some embodiments, the promotional offer module 320 may be in communication with a promotional offer server (e.g., an advertisement server) that stores and provides promotional offers for playback;
  - a media request processing module 322 for retrieving media content items for playback, including primary media content items that are requested by a user and secondary media content items that are not requested by a user. The secondary media content item may be any of a song, podcast episode, newscast, radio broadcast, or a promotional offer (e.g., advertisement). When the secondary media content item is a promotional offer, the media request processing module 322 may work with the promotional offer module 320 to select and provide a promotional offer for playback. When the secondary media content item is selected from a plurality of different versions, the media request processing module 322 determines and selects which version of the secondary media content item to provide for playback;
  - a dynamic insertion module 324 for selection of a secondary media content item for dynamic insertion during playback of a primary media content item. For example, the dynamic insertion module 324 may select the secondary media content item based on content in the primary media content item or based on information stored in a user's profile; and
  - a secondary content item tracking module 326 for tracking statistics on playback of secondary media content items. For example, the secondary content item tracking module 326 may determine how much of the secondary media content item was played (e.g., how long). In another example, the secondary content item tracking module 326 may track how many times a specific promotional offer is provided and/or how many promotional offers result in a purchase or a user interaction with the promotional offer (e.g., in which user navigates to a link associated with the promotional offer); and
- one or more server data module(s) 330 for handling the storage of and/or access to media items and/or metadata relating to the media items; in some embodiments, the one or more server data module(s) 330 include:
  - a media content database 332 for storing media content items;
  - a listening history database 334 (also referred to as a playback history database) for storing (e.g., as a list for each user) media content items that have been consumed (e.g., streamed, listened, viewed) by a respective user as well as storing listener retention information for media content items played by a respective user;
  - a promotional offer database 336 for storing promotional offers; and
  - a profile database 338 for storing user profiles (e.g., user information) of users of the media-providing service.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores one or more of the above identified modules described with regard to memory 306. In some embodiments, memory 306 stores one or more of the above identified modules described with regard to memory 212.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or promotional offer database 336 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4A:
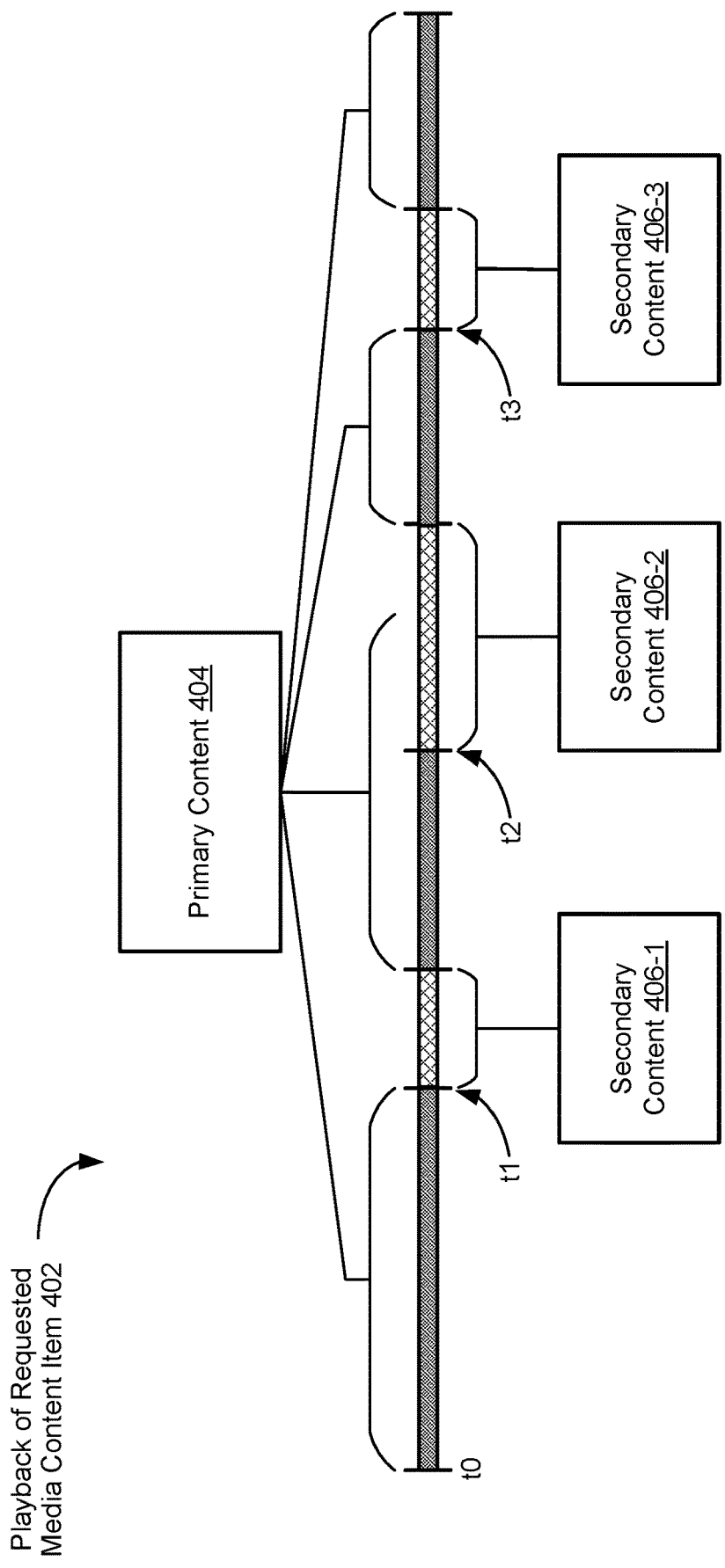
FIG. 4A illustrates a media content item that includes a secondary media content item, in accordance with some embodiments.

FIG. 4A illustrates a media content item 402 that includes primary content 404 (e.g., primary media content item 404) and one or more secondary content 406 (e.g., secondary media content items 406), in accordance with some embodiments. For example, a user may request playback of the media content item 402 (e.g., a podcast episode), which includes both primary content 404 (e.g., the substance of the podcast itself, such as a main narrative or an interview), as well as secondary content 406 (e.g., promotional offer(s), advertisement(s), song(s), musical interlude(s)). In this example, there are three secondary media content items 406-1, 406-2, and 406-3. The secondary media content items 406 may be a same type of media content item (e.g., promotional offers) or may be different types of media content items. For example, secondary media content items 406-1 and 406-2 may be promotional offers, and the secondary media content item 406-2 may be a song. Each of the secondary media content items 406 are inserted at an insertion time within the primary media content item 404. In this example, the primary media content item 404 starts at time $t_0$, usually corresponding to 0 minutes and 0 seconds (e.g., a start of the primary media content item 404). At insertion time t1, playback of the media content item 402 includes pausing (e.g., temporarily ceasing, halting) playback of the primary content 404, and initiating playback of the secondary media content item 406-1. Playback of the secondary media content item 406-1 continues until the end of the secondary media content item 406-1 or until a user provides an input to skip playback of the secondary media content item 406-1, at which point playback of the primary content 404 resumes where it left off (e.g., at insertion time t1 of the primary content 404). Playback of secondary media content items 406-2 and 406-3 is initiated at insertion times t2 and t3 of the primary media content item 404, respectively. In some embodiments, the insertion times (e.g., t1, t2, t3) within the primary content 404 are provided by a producer (e.g., source) of the primary media content item 404. In some embodiments, an indication of at least one of the one or more secondary media content item(s) 406 (e.g., an identifier, a file name, a media content name) are provided by a producer of the primary media content item 404. For example, a producer of the primary media content item 404 may indicate that playback of Song A by Band B should be initiated at insertion time t2 within the primary media content item 404 during playback of the requested media content item 402. In some embodiments, at least one secondary media content item of the one or more secondary media content items 406 is dynamically selected (e.g., selected after playback of media content item 402 has commenced).

Note that, although FIG. 4A (as well as FIG. 5A, described below) refer to the primary content and the secondary content as a single media content item, in some embodiments, the primary content and the secondary content are presented to the user as separate tracks. Thus, a podcast producer interviewing a musical artist might say, in the podcast, "And here's a track from their latest album, skip forward to return to our interview," at which point the client device switches to the artist's track (an example of secondary content), including presentation of any cover art, etc., associated with the artist's track. If the user skips forward while the artist's track is being presented, however, the user will return to the podcast at the position where they left off.

Examples of how a media content item 402 that includes primary content 404 and secondary content 406 is provided is described below with respect to FIGS. 4B, 5B, and 6.

Figure 4B:
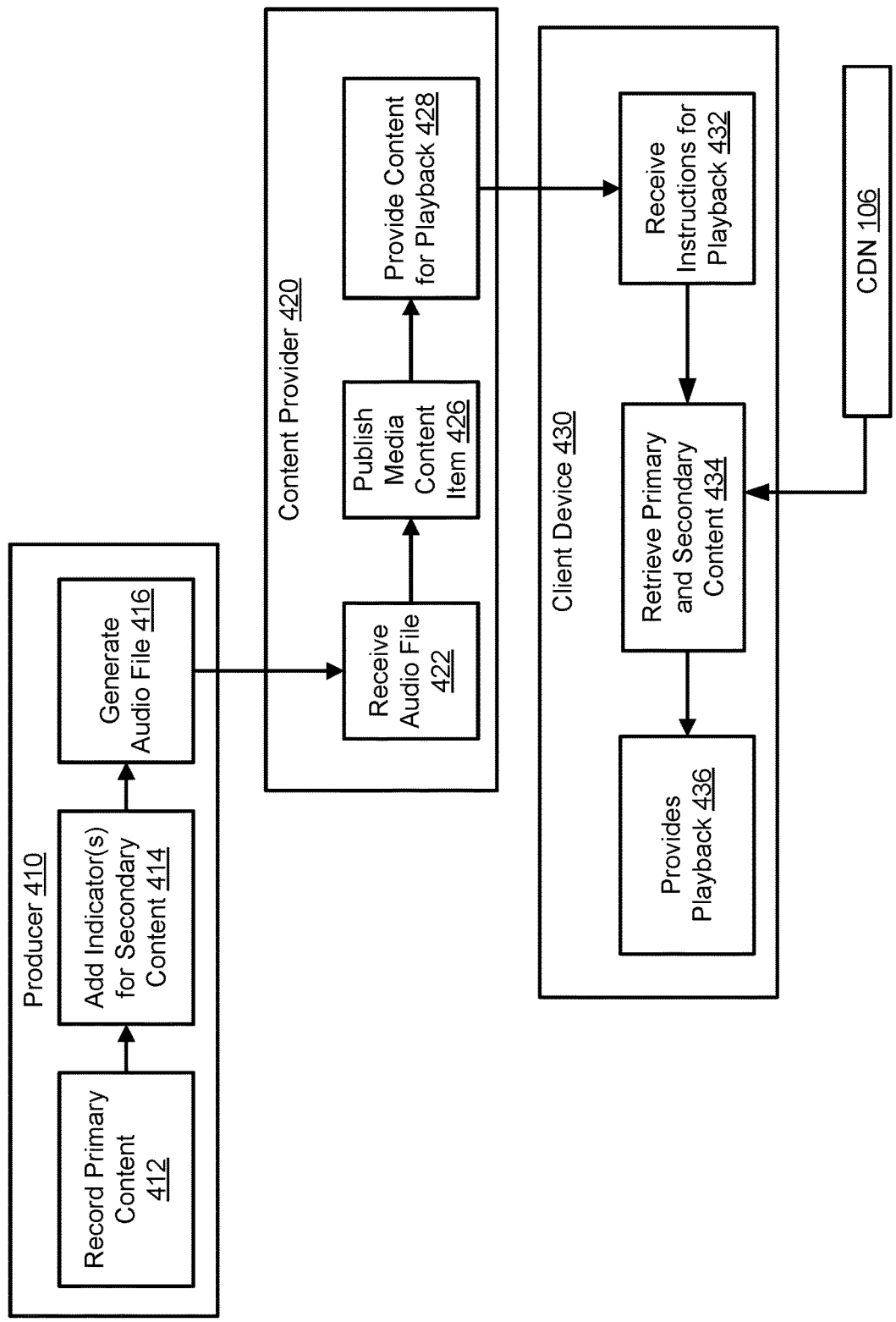
FIG. 4B illustrates providing a media content item that includes a secondary media content item, in accordance with some embodiments.

FIG. 4B illustrates providing a media content item 402 that includes a primary media content item 404, and one or more secondary media content items 406, in accordance with some embodiments. A producer 410 of a media content item records (step 412) the primary content 404 (e.g., generates an audio recording) for the media content item 402. The producer 410 then adds (step 414) (e.g., for inclusion in the file of the primary media content 404) indicators for secondary content 406 to be included during playback of the primary content 404 (e.g., a pointer to the secondary content 406 that includes an identifier of the secondary content 406). The secondary content 406 is different from the primary content 404 and may be a same type of content or a different type of content. For example, the primary content 404 may be a podcast episode and the secondary content 406 may be a song. In another example, the primary content 404 may be a podcast episode and the secondary content 406 may be another podcast episode or a news clip (that is different from the episode being recorded). In some embodiments, the secondary content 406 must have been produced (e.g., must already exist) prior to generation of the media content item 402. The indicators for the secondary content 406 includes information indicating what the secondary content 406 is (e.g., song A by Artist B, or promotional offer ID #1234 from Company C), and a time (e.g., insertion time) within the primary content 404 to initiate playback of the secondary content 406 (e.g., start playing song A by Artist B at 5 minutes and 24 seconds into playback of the primary content). The producer 410 then generates (step 416) an audio file that includes the primary content 404 as well as indicators for the secondary content 406 (e.g., through a graphical user interface associated with content provider 420). The indicators for the secondary content 406 may be, for example, stored in the metadata of the audio file, or stored as instructions for playback of the audio file.

A content provider 420 (such as media content server 104 or CDN 106) may receive (step 422) the audio file for the media content item 402 generated by the producer 410. The content provider 420 then publishes (step 426) the media content item 402 (e.g., makes the content available on their platform), including instructions for queuing the primary content 404 and secondary content 406 for playback as intended by the producer 410 (e.g., based on indications received from the producer 410). When the content provider 420 receives a request from a client device 430 for playback of the media content item 402, the content provider 420 provides (step 428) the media content item 402 (e.g., provides instructions for playing back the media item) to the client device 430 for playback, including instructions for queuing the primary content 404 and secondary content 406 for playback. The client device 430 receives (step 432) the instructions for playback of the requested media content item 402, retrieves the primary and secondary content (step 434) from CDN 106 (FIG. 1) and provides (step 436) playback of the requested media content item 402, including playback of the primary content 404 (which corresponds to the requested content), and playback of secondary content 406 (which may not be explicitly requested for playback). For example, a user may request playback of season 2, episode 2 of podcast A. Playback of season 2, episode 2 of podcast A may include primary content 404 (e.g., the podcast episode as recorded by the producer 410), as well as secondary content 406, such as a musical interlude playing Song B by Artist C. For example, season 2, episode 2 of podcast A may be an interview with Artist C and as part of the episode, the producer 410 wishes to include the latest new song from Artist C, Song B, during playback of the episode. Thus, while Song B by Artist B is not explicitly requested by the user, Song B is provided to the user as part of playback of the requested podcast episode.

Figure 5A:
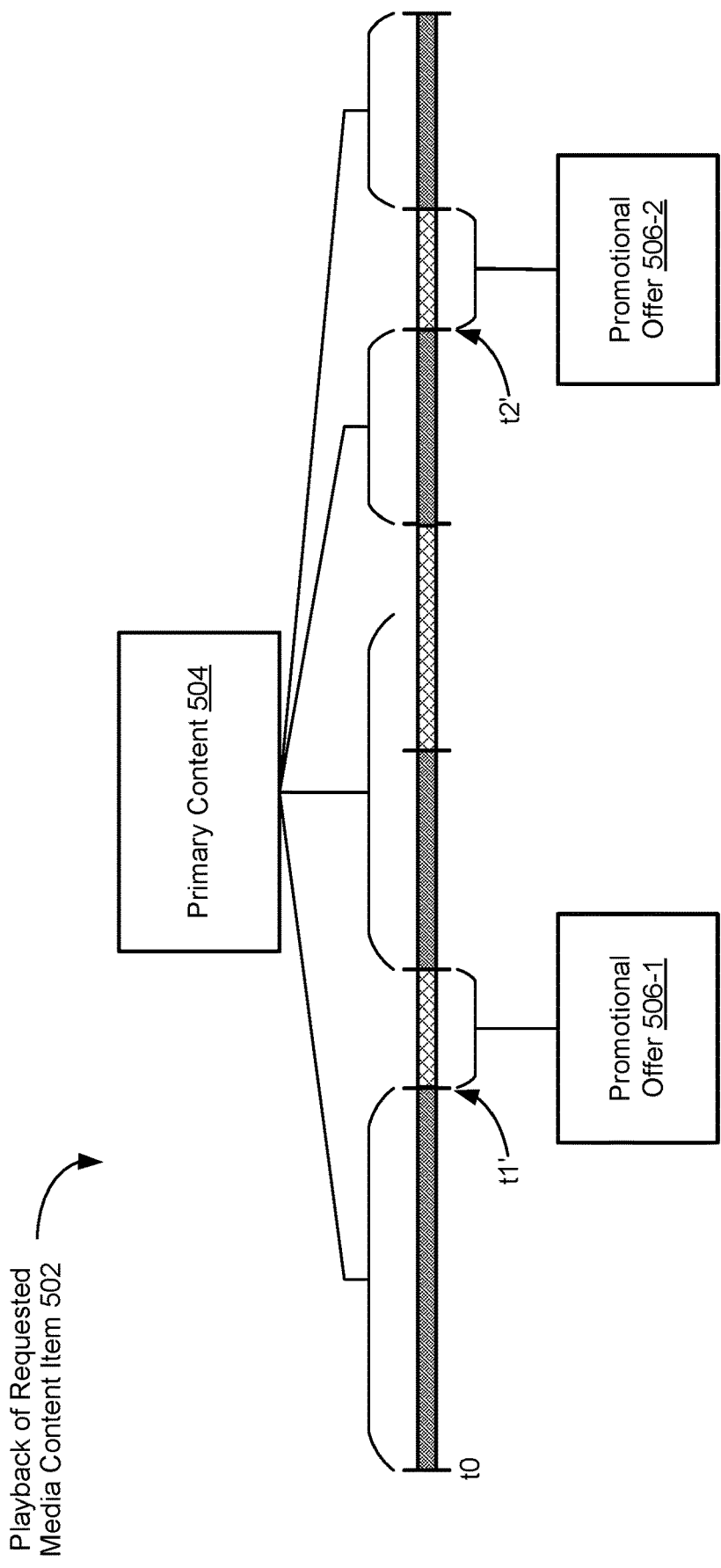
FIG. 5A illustrates a media content item that includes a promotional offer, in accordance with some embodiments.

FIG. 5A illustrates a media content item 502 that includes primary content 504 and secondary content that includes one or more promotional offers 506, in accordance with some embodiments. Media content item 502 is similar to media content item 402, described above with respect to FIG. 4A, except that each secondary media content item in the media content item 502 is a promotional offer 506. In some embodiments, the one or more promotional offers 506 are related to one another (e.g., from a same company, for a same product, are two parts of a same promotional narrative, are the same). In some embodiments, the one or more promotional offers 506 are distinct from one another. In some embodiments, the one or more promotional offers 506 are not related to one another. For example, the promotional offer 506-1 may be for a meal delivery service and promotional offer 506-2 may be for a mattress. Media content item 502, primary content 504, and promotional offers 506 correspond to the media content item 402, primary content 404, and secondary content 406, respectively, as described in FIG. 4A. Thus, details regarding media content item 502, primary content 504, and promotional offers 506 can be found above with respect to FIG. 4A and are not repeated here for brevity.

Figure 5B:
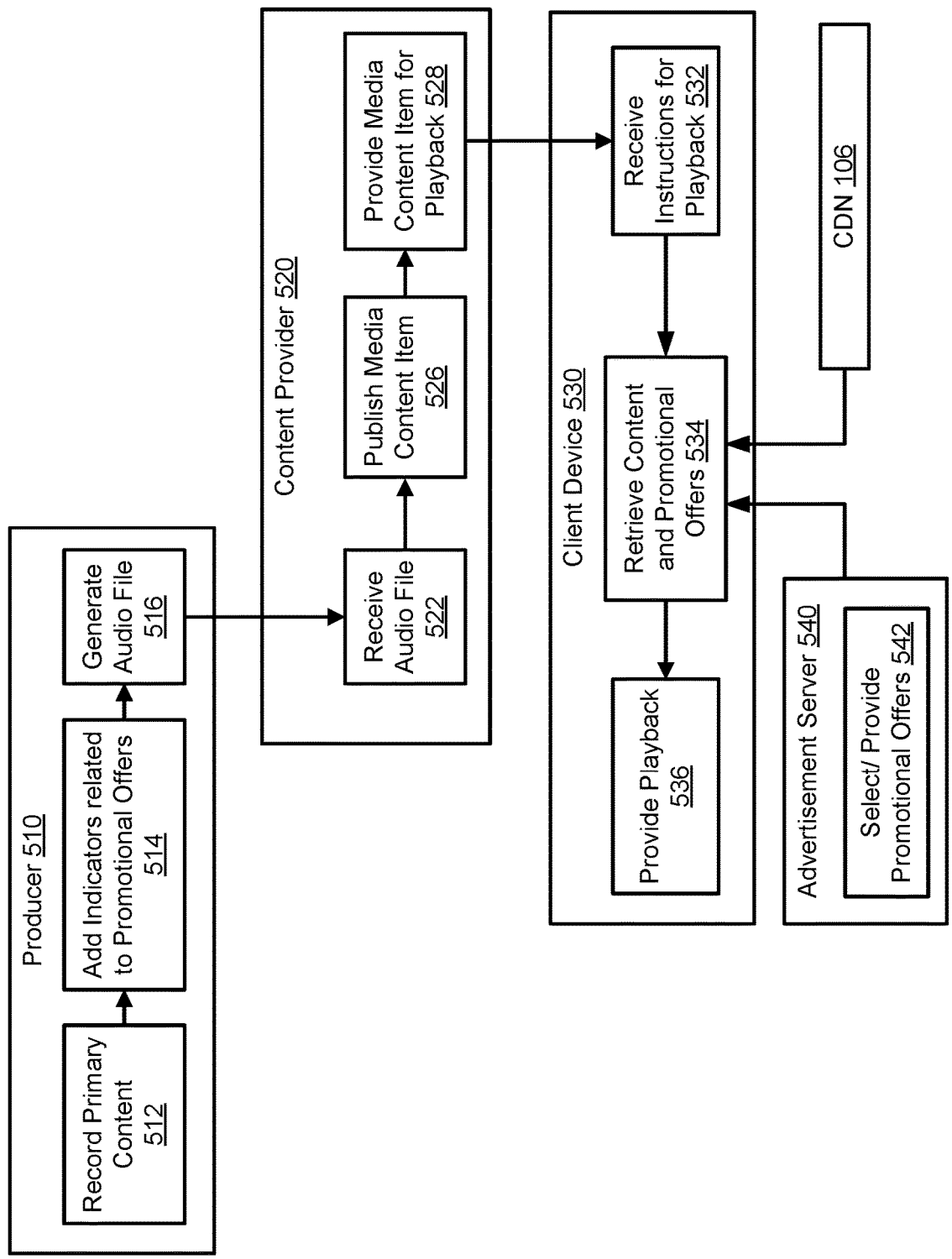
FIG. 5B illustrates providing a media content item that includes a promotional offer, in accordance with some embodiments.

FIG. 5B illustrates providing a media content item 502 that includes primary content 504 and one or more promotional offers 506, in accordance with some embodiments. A producer 510 (e.g., source) of a media content item 502 records (step 512) the primary content 504 (e.g., generates an audio recording) for the media content item 502. The producer 510 then adds (step 514) one or more indicators for one or more promotional offers 506 (e.g., secondary content) to be included during playback of the primary content 504. The producer 510 adds indicators (e.g., markers) regarding where (e.g., what time) in the primary media content item 504 (e.g., a promotional offer insertion time or a secondary content insertion time) each promotional offer 506 should be played. The producer 510 may also add an indication of types or properties of promotional offers 506 to include in the media content item 502 so that the advertisements are more likely to be related to the primary content, while still being personalized and served in real-time, as described below. The indication regarding a promotional offer insertion time within the primary content 504 and/or the indication of which promotional offer(s) 506 to include in the media content item 502 may be stored in metadata associated with (e.g., metadata of) the media content item 502. The producer 510 then generates (step 516) an audio file that includes the primary content 504 as well as indicators for the promotional offer(s) 506. The indicators for the promotional offer(s) 506 may be, for example, stored in the metadata of the audio file, or stored as instructions for playback of the audio file.

A content provider 520 (such as media content server 104 or CDN 106) may receive (step 522) the audio file for the media content item 502 generated by the producer 510. The content provider 520 publishes (step 526) the media content item 502, including instructions for queuing the primary content 504 and the promotional offer(s) 506 for playback as intended by the producer 510 (e.g., based on indications received from the producer 510). When the content provider 520 receives a request from a client device 530 for playback of the media content item, the content provider 520 provides (step 528) the media content item 502 to the client device 430 for playback, including instructions for queuing the primary content 504 and the promotional offer(s) 506 for playback. The client device 530 receives (step 532) the instructions for playback of the requested media content item 502, and retrieves the content (e.g., at step 534 from CDN 106, FIG. 1) and the promotional offers (from advertisement server 540). For example, the promotional offer(s) 506 may be stored or hosted by an advertisement server 540. In some embodiments, advertisement server 540 selects (step 542) promotional offer(s) 506 to be included (e.g., inserted, played) during playback of the media content item 502 and provides the selected promotional offer(s) 506 to the content provider 520. In some embodiments, at least one of the one or more promotional offers 506 may be selected based on information stored in a profile for the user who requested the media content item 502. For example, a user's profile may indicate that the user listens to a lot of podcasts about cooking, thus, the media content item 502 may include a promotional offer 506 for a meal kit delivery service (e.g., even if the primary content 504 has nothing to do with food or cooking). In some embodiments, the promotional offers are selected in real-time (e.g., within one second, or less, of the time that the promotional offer is to be played). In some embodiments, the promotional offer is selected based at least in part on which promotional offer campaigns are active at the time the promotional offer is requested from the advertisement server 540.

The client device 530 provides (step 536) playback of the requested media content item 502, including playback of the primary content 504 (which corresponds to requested content), and playback of promotional offer(s) 506 (which are not requested for playback). For example, a user may request playback of chapter 7 of Book A. Playback of chapter 7 of Book A may include primary content 504 (e.g., chapter 7 of Book A as recorded by the producer 510), as well as the promotional offer(s) 506, such as a first promotional offer 506-1 for an audiobook subscription and a second promotional offer 506-2 for a new clothing store.

Figure 6:
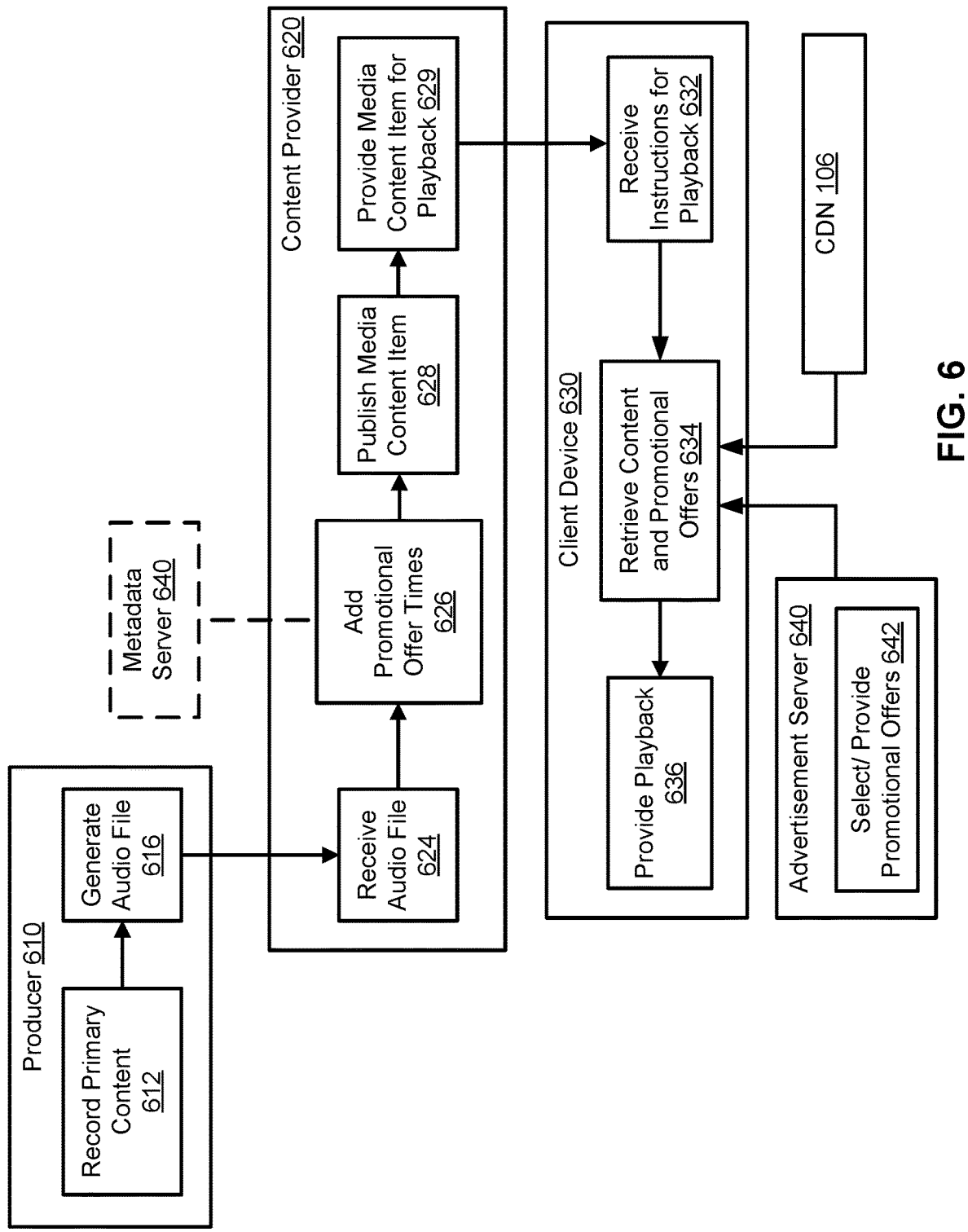
FIG. 6 illustrates replacing one or more "baked in" promotional offers in a media content item with dynamically selected promotional offers, in accordance with some embodiments.

FIG. 6 illustrates replacing one or more "baked in" promotional offers in a media content item with dynamically selected promotional offers, in accordance with some embodiments. A producer 610 (e.g., source) records a primary content item (step 612) (e.g., a podcast). The producer 610 generates an audio file (step 616) that has "baked in" promotional offers, meaning that the promotional offers are part of the audio of the generated audio file (i.e., the audio file includes the primary content as well as promotional offers). As such, if the audio file were to be provided at the client device as-is, it would be difficult to track impressions of individual promotional offers (thus making it difficult to appropriately monetize the promotional offers), and, by definition, impossible to dynamically serve advertisements (e.g., select advertisements in real-time, just before they are to be played, based on characteristics of the user, content, and/or which promotional offer campaigns are active).

Rather than using the "baked in" promotional offers, in some embodiments, the content provider 620 replaces the "baked in" promotional offers with promotional offers served in real-time. To do so, after receiving the audio file (step 624), the content provider 620 adds promotional offer times (step 626), e.g., as metadata of the audio file. In some embodiments, the promotional offer times comprise timing information indicating start and stop times of the "baked in" promotional offers. The content provider 620 publishes the media content item (step 628) with the promotional offer times, e.g., as metadata.

When the content provider 620 receives a request from a client device 630 for playback of the media content item, the content provider 620 provides (step 629) the media content item to the client device for playback, including instructions for queuing the primary content 504 until a start time of a "baked in" promotional offer, followed by the primary content item starting an end time of the promotional offer (e.g., without playing the "baked in" promotional offer). In some embodiments, the "baked in" promotional offer may be replaced with one or more promotional offers selected (step 642) by an advertisement server 640 (e.g., as new, dynamically selected promotional offers). Note that the new, dynamically selected, promotional offers may be longer or shorter than the original "baked in" promotional offer and may occur at the same position or a different position than the original "baked in" promotional offer. Because the new, dynamically selected, promotional offers are served in real-time, these promotional offers can be targeted to the client device 630 based on a user history of the client device 630, a context of the current listening session (time of day, etc.), which promotional offer campaigns are currently active, and the like, as well as properly monetized based on impression counts.

The client device 630 receives (step 632) the instructions for playback of the requested media content item, and retrieves (step 624) the content (e.g., from CDN 106, FIG. 1) and the promotional offers (e.g., from advertisement server 640). The client device 630 provides (step 636) playback of the requested media content item, including playback of the primary content (which corresponds to requested content), and playback of the new, dynamically selected, promotional offer(s) (which are not requested for playback).

Figure 7B:
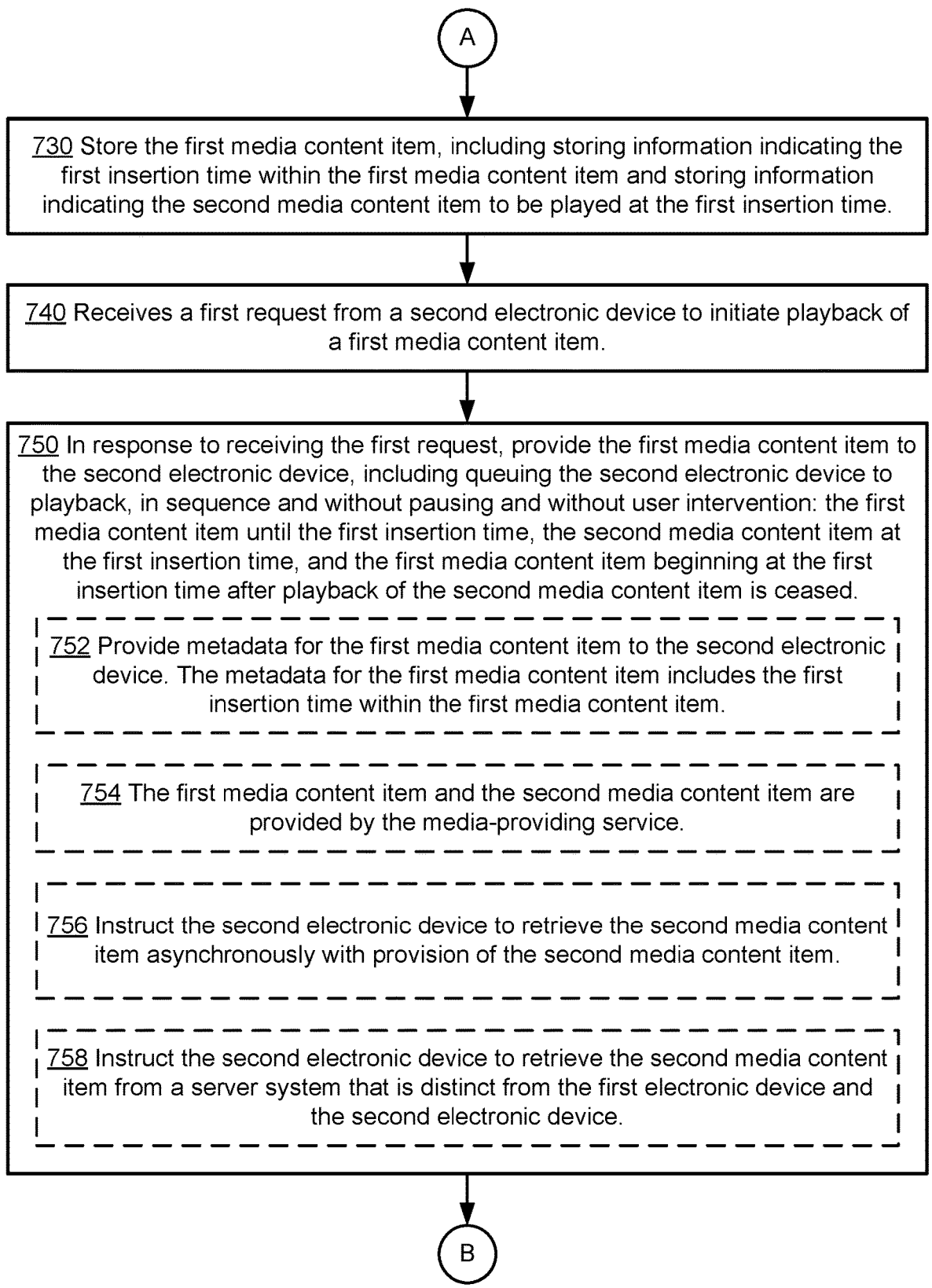
Figure 7C:
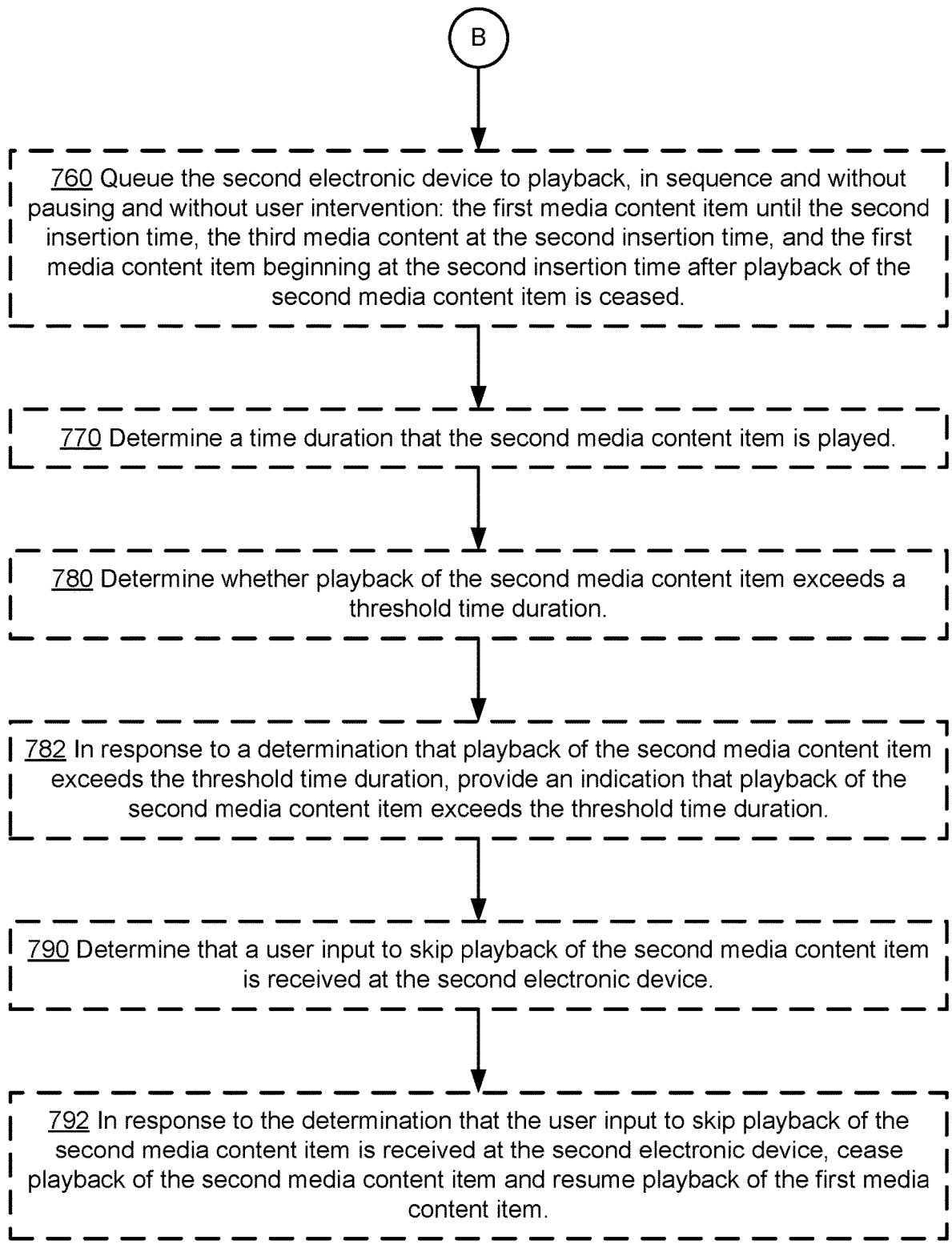

FIGS. 7A-7C are flow diagrams illustrating a method 700 of providing a media content item that includes primary media content item and secondary media content item, in accordance with some embodiments. Method 700 may be performed (702) at an electronic device (e.g., media content server 104) having one or more processors and memory storing instructions for execution by the one or more processors. In some embodiments, the method 700 is performed by executing instructions stored in memory (e.g., memory 306, FIG. 3) of the electronic device.

In performing the method 700, an electronic device receives (710) a first media content item (e.g., primary media content item) from a producer (e.g., source, producer 410, 510, 610) of the first media content item, including receiving information indicating: (i) a first insertion time within the first media content item, and (2) a second media content item (e.g., secondary media content item, promotional offer) to be played at the first insertion time. The second media content item is distinct from the first media content item and the second media content item is identified by the producer (e.g., source) of the first media content item. For example, the producer may include an indication of a specific media content item to be the second media content item (e.g., a specific song, a specific podcast episode, a specific advertisement). The electronic device stores (730) the first media content item, including storing information indicating the first insertion time within the first media content item and storing information indicating the second media content item to be played at the first insertion time. The electronic device receives (740) a first request from a second electronic device (e.g., client device 430, 530, 630) to initiate playback of a first media content item. In response to receiving the first request, the electronic device provides (750) the first media content item to the second electronic device, including queuing the second electronic device to playback, in sequence and without pausing and without user intervention: the first media content item until the first insertion time, the second media content item at the first insertion time, and the first media content item beginning at the first insertion time after playback of the second media content item is ceased.

In some embodiments, the electronic device receives (712) an identifier corresponding to the second media content item from the producer (e.g., producer 410, 510, 610) of the first media content item.

In some embodiments, the first media content item includes (714) spoken word content (e.g., is a podcast, podcast episode) and the second media content item is music.

In some embodiments, the electronic device selects (716) a version from a plurality of versions of the second media content item for playback. The selected version of the second media content item is selected based at least in part on a location of the second electronic device (e.g., physical location of the second electronic device, registered location of a profile associated with the second electronic device).

In some embodiments, the second media content item is (718) associated with the first media content item. For example, the first media content item may be a podcast episode that includes an interview with Artist A, and the second media content item may be a song from Artist A's latest album. In another example, the first media content item may be a podcast episode about sports and the second media content item may be a promotional offer for a sale on athletic shoes.

In some embodiments, the first media content item includes embedded content and the second media content item replaces the embedded content (e.g., as described with reference to FIG. 6). For example, the first media content item may include an embedded promotional offer (e.g., embedded advertisement) that may be outdated (e.g., relevant when the first media content item was first published, 3 years ago), and the second media content item may be a new promotional offer (e.g., a new advertisement) that is currently relevant (e.g., not outdated).

In some embodiments, the first media content item further includes (722) information indicating: (i) a second insertion time within the first media content item and a third media content item. The second insertion time is different from the first insertion time. The third media content item is distinct from each of the first media content item and the second media content item. In some embodiments, the electronic device queues (760) the second electronic device to playback, in sequence and without pausing and without user intervention: the first media content item until the second insertion time, the third media content at the second insertion time, and the first media content item beginning at the second insertion time after playback of the second media content item is ceased.

In some embodiments, the first media content item is (724) not an RSS feed (e.g., the first media content item includes additional metadata fields beyond what is provided in RSS feeds in order to support the operations described herein).

In some embodiments, the electronic device provides (752) metadata for the first media content item to the second electronic device. The metadata for the first media content item includes the first insertion time within the first media content item.

In some embodiments, the first media content item and the second media content item are (754) provided by the media-providing service (e.g., media content server 104).

In some embodiments, the electronic device instructs (756) the second electronic device to retrieve the second media content item asynchronously with provision of the second media content item. For example, the second electronic device may be instructed to retrieve the second media content item prior to initiating playback of the second media content item.

In some embodiments, the electronic device instructs (758) the second electronic device to retrieve the second media content item from a server system that is distinct from the first electronic device and the second electronic device.

In some embodiments, the electronic device determines (770) a time duration that the second media content item is played. In some embodiments, the determination of the time duration that the second media content item is played is used for impression tracking and/or monetization of the second media content item.

In some embodiments, the electronic device determines (780) whether playback of the second media content item exceeds a threshold time duration. In some embodiments, in response to a determination that playback of the second media content item exceeds the threshold time duration, the electronic device provides (782) an indication that playback of the second media content item exceeds the threshold time duration.

In some embodiments, the electronic device determines (790) that a user input to skip playback of the second media content item is received at the second electronic device. In some embodiments, in response to a determination that the user input to skip playback of the second media content item is received at the second electronic device, the electronic device ceases (792) playback of the second media content item and resumes playback of the first media content item.

Although FIGS. 7A-7C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
at a first electronic device associated with a media-providing service, the first electronic device having one or more processors and memory storing instructions for execution by the one or more processors:
receiving a first media content item;
receiving information indicating:
a first insertion time within the first media content item; and
a second media content item to be played at the first insertion time and/or one or more properties of the second media content item, wherein the second media content item is distinct from the first media content item, and wherein the second media content item and/or the one or more properties of the second media content item are identified by a source of the first media content item;
storing the first media content item, including storing information indicating the first insertion time within the first media content item and the information indicating the second media content item to be played at the first insertion time and/or the one or more properties of the second media content item;
receiving a first request from a second electronic device to initiate playback of the first media content item; and
in response to receiving the first request, providing the first media content item to the second electronic device, including queuing the second electronic device to playback, in sequence and without pausing and without user intervention:
the first media content item until the first insertion time;
the second media content item at the first insertion time; and
the first media content item resumed after playback of the second media content item is ceased;
determining whether playback of the second media content item exceeds a threshold time duration; and
in response to a determination that playback of the second media content item exceeds the threshold time duration, providing an indication that playback of the second media content item exceeds the threshold time duration.

2. The method of claim 1, wherein:
receiving information indicating the second media content item to be played at the first insertion time and/or the one or more properties of the second media content item includes receiving, from the source of the first media content item, an identifier corresponding to the second media content item.

3. The method of claim 1, further comprising, in response to receiving the first request, providing, to the second electronic device:
metadata for the first media content item, wherein the metadata for the first media content item includes the first insertion time within the first media content item.

4. The method of claim 1, wherein the first media content item includes spoken word content and the second media content item is music.

5. The method of claim 1, wherein the second media content item includes a plurality of versions, and the method further comprises:
selecting a version of the plurality of versions of the second media content item for playback, wherein the selected version of the second media content item is selected based at least in part on a location of the second electronic device.

6. The method of claim 1, further comprising:
determining that a user input to skip playback of the second media content item is received at the second electronic device; and
in response to the determination that the user input to skip playback of the second media content item is received at the second electronic device, ceasing playback of the second media content item and resuming playback of the first media content item.

7. The method of claim 1, wherein the second media content item is associated with content in the first media content item.

8. The method of claim 1, wherein the first and second media content items are provided by the media-providing service.

9. The method of claim 1, further comprising:
determining a time duration that the second media content item is played.

10. The method of claim 1, further including:
instructing the second electronic device to retrieve the second media content item asynchronously with provision of the second media content item.

11. The method of claim 1, wherein the first media content item includes embedded content and the second media content item replaces the embedded content.

12. The method of claim 1, including:
receiving information indicating:
  a second insertion time within the first media content item, the second insertion time being different from the first insertion time;
  a third media content item and/or one or more properties of the third media content item that is distinct from each of the first media content item and the second media content item and/or the one or more properties of the second media content item; and
queuing the second electronic device to playback, in sequence and without pausing and without user intervention:
  the first media content item until the second insertion time;
  the third media content item at the second insertion time; and
  the first media content item resumed after playback of the third media content item is ceased.

13. The method of claim 1, wherein queuing the second electronic device to playback the second media content item includes instructing the second electronic device to retrieve the second media content item from a server system that is distinct from the first electronic device and the second electronic device.

14. The method of claim 1, wherein the first media content item is not an RSS feed.

15. A server system of a media-providing service, comprising:
one or more processors; and
memory storing one or more programs for execution by the one or more processors, the one or more programs comprising instructions for performing a set of operations, comprising:
receiving a first media content item;
receiving information indicating:
  a first insertion time within the first media content item; and
  a second media content item to be played at the first insertion time and/or one or more properties of the second media content item, wherein the second media content item is distinct from the first media content item, and wherein the second media content item and/or the one or more properties of the second media content item are identified by a source of the first media content item;
storing the first media content item, including storing information indicating the first insertion time within the first media content item and the information indicating the second media content item to be played at the first insertion time and/or the one or more properties of the second media content item;
receiving a first request from a second electronic device to initiate playback of the first media content item; and
in response to receiving the first request, providing the first media content item to the second electronic device, including queuing the second electronic device to playback, in sequence and without pausing and without user intervention:
  the first media content item until the first insertion time;
  the second media content item at the first insertion time; and
  the first media content item resumed after playback of the second media content item is ceased;
determining whether playback of the second media content item exceeds a threshold time duration; and
in response to a determination that playback of the second media content item exceeds the threshold time duration, providing an indication that playback of the second media content item exceeds the threshold time duration.

16. A non-transitory computer-readable storage medium storing one or more programs configured for execution by a computer system associated with a media-providing service, the one or more programs comprising instructions for performing a set of operations, comprising:
receiving a first media content item;
receiving information indicating:
  a first insertion time within the first media content item; and
  a second media content item to be played at the first insertion time and/or one or more properties of the second media content item, wherein the second media content item is distinct from the first media content item and wherein the second media content item and/or the one or more properties of the second media content item are identified by a source of the first media content item;
storing the first media content item, including storing information indicating the first insertion time within the first media content item and the information indicating the second media content item to be played at the first insertion time and/or the one or more properties of the second media content item;
receiving a first request from a second electronic device to initiate playback of the first media content item; and
in response to receiving the first request, providing the first media content item to the second electronic device, including queuing the second electronic device to playback, in sequence and without pausing and without user intervention:
  the first media content item until the first insertion time;
  the second media content item at the first insertion time; and
  the first media content item resumed after playback of the second media content item is ceased;
determining whether playback of the second media content item exceeds a threshold time duration; and
in response to a determination that playback of the second media content item exceeds the threshold time duration, providing an indication that playback of the second media content item exceeds the threshold time duration.

17. The server system of claim 15, wherein:
receiving information indicating the second media content item to be played at the first insertion time and/or the one or more properties of the second media content item includes receiving, from the source of the first media content item, an identifier corresponding to the second media content item.

18. The method of claim 1, further comprising:
selecting the second media content item to be inserted into the first media content item based on the one or more properties of the second media content item.

19. The server system of claim 15, wherein the set of operations further comprises:
selecting the second media content item to be inserted into the first media content item based on the one or more properties of the second media content item.

20. The non-transitory computer-readable storage medium of claim 16, wherein the set of operations further comprises:
selecting the second media content item to be inserted into the first media content item based on the one or more properties of the second media content item.

\* \* \* \* \*